April 16, 1963  B. S. WILDI  3,086,001
PYROMELLITONITRILE/HYDROGEN SULFIDE REACTION PRODUCT
Filed March 7, 1960
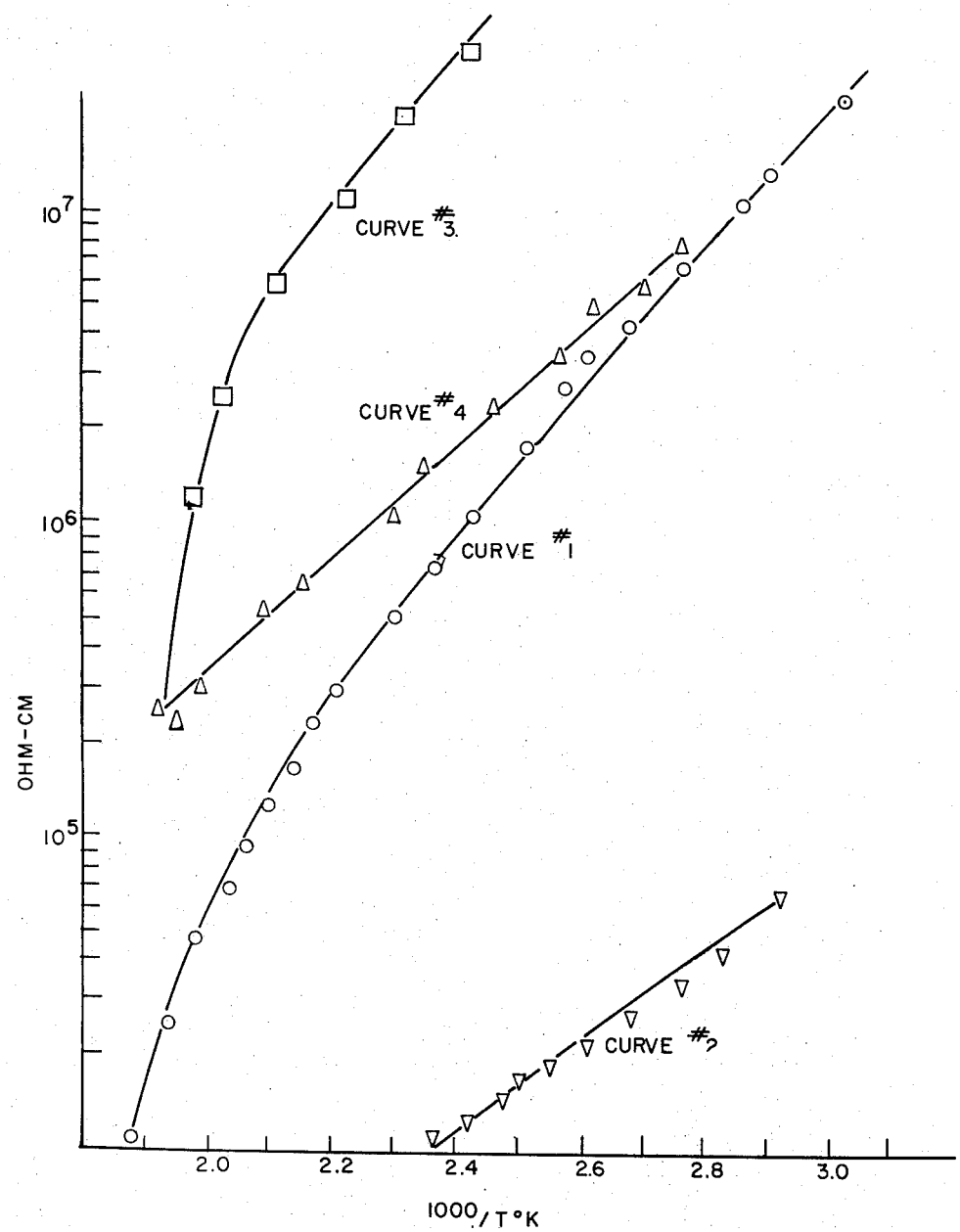
INVENTOR.
BERNARD S. WILDI
BY Lloyd B. Stevens, Jr.
ATTORNEY

United States Patent Office 3,086,001
Patented Apr. 16, 1963

3,086,001
PYROMELLITONITRILE/HYDROGEN SULFIDE
REACTION PRODUCT
Bernard S. Wildi, Dayton, Ohio, assignor to Monsanto
Chemical Company, St. Louis, Mo., a corporation of
Delaware
Filed Mar. 7, 1960, Ser. No. 13,355
11 Claims. (Cl. 260—125)

The invention relates to new compositions and articles or bodies made therefrom which are pyromellitonitrile/hydrogen sulfide reaction products, pyrolyzed pyromellitonitrile/hydrogen sulfide reaction products and pyrolyzed articles, bodies, discs, wafers, components or pellets.

It has now been found that hydrogen sulfide and pyromellitonitrile react to form a new and useful material. The reaction takes place in the absence of a catalyst but is preferably carried out in the presence of a base catalyst. Preferably the base used is a volatile base such as ammonium hydroxide or pyridine residual amounts of which will be removed during the pyrolysis of the reaction product; however, other bases can be used such as alkali metal hydroxide, alkaline earth metal hydroxide, etc. These reaction products of hydrogen sulfide and pyromellitonitrile are readily compressed with or without the use of a binder into articles, pellets, bodies or wafers and the like, which especially after pyrolysis are useful as semiconductor bodies or components. The articles or bodies can be formed by cold pressing or hot pressing as may be most desirable to give articles of desired strength. With respect to the formation of these bodies, the process, for the purposes of this application, is defined as pelleting or pelleted which includes the formation of a pellet of any shape of body or component by pressure with or without heating.

It is an object of this invention to provide new and useful compositions of matter.

It is another object of this invention to provide new components useful in barrier layer devices.

These and other objects of the invention will be apparent as the detailed description of the invention proceeds.

In making the basic compositions hydrogen sulfide and pyromellitonitrile are reacted together to form a solid reaction product. The reaction product contains substantially 2 moles of hydrogen sulfide per mole of pyromellitonitrile, and it is preferred to use an excess of hydrogen sulfide in making the reaction product over the 2:1 ratio to insure the production of the desired reaction product. Pyromellitonitrile is a new compound which is described in detail in copending application Serial No. 696,026, filed November 15, 1957, now abandoned. It is preferred to carry out the reaction in the presence of a solvent for the pyromellitonitrile which is a solid compound. The reaction proceeds at temperatures of less than room temperature but can be carried on at somewhat elevated temperatures to increase the speed of reaction, if desired.

The pyrolyzed product is produced by heating the reaction product either in powdered or pelleted form under high vacuum or in the presence of an inert atmosphere at a temperature in the range of about 180–700° C., preferably 300–600° C. The time of heating varies with the temperature and the properties of the product desired and may vary from an hour or less to a number of days.

Pellets can be formed from the products without the use of binders using a sufficient pressure to fuse the powdered material into a pellet of a desired strength. Heat can be applied during the pelleting operation to aid in the formation of the pellets but is not necessary.

The invention will be more clearly understood from the following detailed description of specific examples thereof read in conjunction with the accompanying FIGURE which is a graph of the electrical properties of powdered material which has been pyrolyzed to a limited degree. Log resistivity is plotted versus 1000 over the absolute temperature in the figure.

EXAMPLE 1

This example describes the production of a pyromellitonitrile/hydrogen sulfide reaction product made in the absence of a base catalyst. A sample of 27.6 g. of pyromellitonitrile and 350 ml. of ethanol was added to a 500 ml. round bottom flask fitted with a stirrer, thermometer, gas inlet tube and condenser. The mixture was cooled to −5° C. and hydrogen sulfide was added for a period of six hours. After the termination of the hydrogen sulfide addition, the reaction mixture was allowed to warm up to room temperature over a period of 18 hours. Then hydrogen sulfide addition was again begun and continued over an additional six hour period. The reaction mixture was now black in color and it was allowed to stand in the flask open to the air until all the solvent had evaporated. The solid residue material remaining in the flask was insoluble in chloroform, ethanol, and benzene, was very soluble in dimethylformamide and slightly soluble in glacial acetic acid and acetic anhydride. After the solvent had evaporated, the reaction mixture was heated up with 700 ml. of glacial acetic acid on a steam bath and filtered hot. Some low molecular weight crystalline material was removed in the filtrate. The residue was warmed to 110° C. in 500 ml. of acetic anhydride and again the reaction mixture was filtered hot. Additional material was removed with the filtrate. The residue from the filtration was refluxed with two 700 ml. portions of acetic anhydride. The total weight of the residue product recovered from the solvent extractions described above was 24 g. An elemental analysis of this residue material was 51.8% C., 3.5% H. This residue product which was insoluble in hot acetic acid and hot in acetic anhydride is the desired hydrogen sulfide/pyromellitonitrile reaction product.

EXAMPLE 2

This example describes the preparation of a pyromellitonitrile and hydrogen sulfide reaction product made in the presence of the base sodium hydroxide. A sample of 27.6 g. of pyromellitonitrile was suspended in 320 ml. of ethanol in a flask equipped with a stirrer. To this flask was added 80 g. of sodium sulfide in 50 ml. of water, the sodium sulfide being prepared by saturating sodium hydroxide with hydrogen sulfide. Upon the addition of the sodium sulfide solution the nitrile went into solution giving a purple solution. The temperature of the reaction mixture rose to 34–38° C. and stirring of the reaction mixture was continued overnight. The next day an equal volume of water was added to the reaction mixture which was filtered. The gelatinous solid product recovered from the filtration step was treated with 2 liters of boiling ethanol in 500 ml. quantities, then dried in air. The residue product remaining after the drying step was 15 g. This residue product was subjected to sublimation treatment at 180° C./10$^{-4}$ mm. Hg absolute pressure. The residue product from the sublimation step had the following elemental analysis:

|   | Found, percent | Calcd. for $C_{10}H_9N_3SNa_2O$, percent |
|---|---|---|
| C | 45.3 | 45.3 |
| H | 3.2 | 3.4 |
| S | 11.7 | 12.1 |
| N | 14.0 | 15.8 |

EXAMPLE 3

This example describes the preparation of pyromellitonitrile/hydrogen sulfide reaction product prepared in the presence of the base ammonium hydroxide. A sample of 20 g. of pyromellitonitrile, 400 ml. of ethanol and 40 ml. of concentrated (about 28% $NH_3$) ammonium hydroxide were placed in a three-necked 1 liter flask equipped with a stirrer, thermometer, condenser and a gas inlet tube. Then hydrogen sulfide was passed through the mixture in the flask. The contents of the flask turned dark red immediately and all of the material went into solution. The temperature of the reaction mixture went to 35° C. and was maintained at about this temperature by the controlled addition of hydrogen sulfide. After 3½ hours of hydrogen sulfide addition, the addition of hydrogen sulfide was terminated and the reaction mixture was gradually heated to reflux and maintained at reflux temperatures for 1½ hours. Then the reaction mixture was filtered to recover a solid material which was washed with 2 liters of methanol. The dried residue product from the methanol washing was put in a vacuum sublimator for four days at 200° C./0.2 mm. of Hg absolute pressure. An elemental analysis of the residue product from the vacuum sublimation treatment yielded the following results.

```
                                        Found, percent
C _____ 55.4
H _____ 2.7
S _____ 14.0
```

EXAMPLE 4

This example describes the preparation of a hydrogen sulfide/pyromellitonitrile reaction product made in the presence of pyridine base. Again a three-necked round bottom flask equipped with a stirrer, gas inlet tube, condenser and thermometer was used. In the flask was placed 500 ml. of chlorobenzene, 27 g. of pyromellitonitrile and 5 ml. of pyridine. The reactants in the flask were heated to 40° C. and hydrogen sulfide was added to the flask for 20 minutes keeping the temperature at 40° C. Then heat was applied and the mixture turned from light cream color to gray to greenish gray after 40 minutes. The reaction mixture was heated for 4 hours at 110–115° C. Then the reaction mixture was cooled and filtered. The filter cake was washed with 3 liters of hot acetone which resulted in the leaching out of a red material from the filter cake. The residue product was subjected to vacuum sublimation at 200° C./0.5–0.2 mm. of Hg absolute pressure for several days. At first a small amount of white material sublimed out and finally sulfur. An elemental analysis of the residue product was as follows.

```
                                        Found, percent
C _____ 56.6
H _____ 2.3
N _____ 23.4
```

EXAMPLE 5

This example describes the determination of electrical properties of the hydrogen sulfide/pyromellitonitrile reaction products of Examples 1, 2, 3, and 4, the electrical data being plotted in the figure. Curves 1, 2, 3, and 4 are based on testing the products of Examples 1, 2, 3, and 4, respectively. The material was tested in powdered form as follows: The test cell for the electrical measurement is a hollow quartz cylinder placed upright on a platinum plate which seals the bottom opening of the cylinder. The internal diameter of the quartz cylinder is ¾". The powdered sample to be tested is added to the quartz cylinder to a depth of 1–2 millimeters. A platinum slug is inserted to the top of the quartz cylinder and a pressure of 900 g./sq. cm. is applied through this platinum slug to the powdered sample. The sample is heated by conduction through the platinum plate to a temperature of about 280° C. under a vacuum of about 10$^{-3}$ mm. of Hg at least overnight. The next day the sample is subjected to a series of treatments involving evacuation under high vacuum, purging with nitrogen, evacuation under high vacuum and finally to a nitrogen atmosphere of 5" of Hg absolute pressure for the electrical testing. During the electrical testing the pressure of 900 g./sq. cm. is maintained on the powdered sample as described above. As indicated above, the heating of the samples is accomplished by conduction through the platinum plate upon which the quartz cylinder rests. The curves of FIGURE 1 are all cooling curves, i.e., the measurements are made beginning at the high temperature with successive measurements being taken as the sample cools down. The electrical resistance measurements are made across the thickness of the sample via the platinum plate and the platinum slug. From these electrical resistance measurements the resistivity is calculated and plotted in the figure as the logarithm of the resistivity versus 1000 over the absolute temperature in degrees Kelvin.

EXAMPLE 6

This example describes the preparation of pellets of the reaction product of Example 3, heat treating the pellets and electrical testing thereof. From powdered reaction product of Example 3, two pellets were pressed using a rectangular die 22 x 4.75 mm. and a force of about 20,000 pounds. Prior to pressing the two pellets, the powdered samples were evacuated for 10 minutes at 0.1 mm. of Hg absolute pressure. The pressed pellets were approximately 1 mm. in thickness. The total weight of the two pellets were 0.2410 g. Both pellets were subjected to heat treatment at 520° C./0.2 mm. for 12 hours. Weight of the sample after heat treatment was 0.1732 g. indicating a 28% weight loss. The resistivity and thermoelectric power was measured on one of the samples. Resistivity was measured under a vacuum of about 10$^{-3}$ mm. and was found to be 190 ohm-cm. at room temperature (about 25° C.).

The thermoelectric testing of the sample was carried out in the following fashion: The pellet to be tested was placed on a gold plated copper plate which served as a cold (about 23° C.) electrode of the thermoelectric generator. The hot electrode for the generator was a soldering iron having a gold plated tip which was mounted in a jig and could be raised or lowered by a screw arrangement. Three measurements were taken at different points on the sample and averaged for the thermoelectric power reported. During the measurements the soldering iron was pressed against the upper surface of the sample with sufficient pressure being applied to give good ohmic contact both for the soldering iron and the copper plate with the sample. The series electrical circuit was completed from the gold plated copper plate through a galvanometer, thee soldering iron, the sample and back to the copper plate. In the test the hot probe was heated to approximately 100° above the temperature of the cold plate before being applied to the pellet being tested. The actual hot probe and cold plate temperatures were measured by thermocouple. For each reading the apparatus was allowed to come to equilibrium and the highest voltage generated was noted. Although the pyrolyzed pellets have very good thermoinsulating powers, if the hot probe is maintained in contact with the sample over a long period of time the cold copper plate tends to approach the temperature of the hot probe due to heat of conduction through the sample. This is the reason for taking the highest voltage noted on the galvanometer as the reading, because this is in fact indicative of the thermoelectric properties of the sample. From the thermoelectric test of one heat treated sample a thermoelectric power (TEP) of −24 microvolts/° C. was determined. The negative sign indicates that the sample has N-type conductivity.

The second pellet weighing 0.0674 g. after the heat treatment was placed back in the furnace for further heat treatment at 560° C./0.1–2 mm. of Hg absolute pressure for 40 hours. At the end of this heat treatment the sample weighed 0.0616 g. indicating an additional loss of weight of 8.6%. Conductivity and thermoelectric power tests on this sample resulted in a theremoconductivity ($\rho$) of 22 ohm-centimeters and a thermoelectric power (TEP) of +1.6 $\mu$v./° C. Thus it is seen by this additional heat treatment a pyrolyzed pellet was produced which had P-type conductivity. This P-type conductivity can be maximized by optimum treating temperatures and time of treatment.

Pellets made from the products of Examples 1, 2 and 4 and heat treated in a similar fashion to those of Example 3 have comparable resistivities and thermoelectric powers.

EXAMPLE 7

This example describes the preparation of a number of other pellets from the product of Example 3, the heat treatment and electrical testing thereof. Five separate pellets were prepared having ½″ diameter by hot pressing powdered material at about 325° C. for 15 minutes using about 20,000 pounds force. The heat treatment of these five pellets and the electrical testing thereof is reported in Table I which follows:

*Table I*

| Sample No. | Original sample weight, gms. | Heat treatment [1] | Percent weight loss | Resistivity, ohm-cm. | TEP, $\mu$v./° C. |
|---|---|---|---|---|---|
| 1 | 0.2520 | 1 hr. at 340° C | 12 | 3,700 | −18 |
| 2 | 0.1573 | 2½ hrs. at 422° C | 17 | 310 | −56 |
| 3 | 0.2025 | 14 hrs. at 450° C | 25 | 120 | −34 |
| 4 | 0.2652 | 4½ hrs. at 520° C | 26 | 74 | −15 |
| 5 | 0.1308 | 14 hrs. at 532° C | 28 | 49 | −7 |

[1] Each sample was subjected to the heat treatment indicated opposite the sample in addition to the heat treatments to which each sample above it in the table were subjected. Heat treatments were carried out with the samples under high vacuum of about 0.2 mm. of Hg absolute pressure.

An examination of the data Table I indicates that as the severity and time of heat treatment is increased on the sample the resistivity of the sample is reduced; whereas, the thermoelectric power passes through a maximum, afterwards decreasing. Resistivities reported in the table are measured at room temperature. Thermoelectric and resistivity measurements were carried out in the same manner as described in Example 6.

EXAMPLE 8

This example describes the preparation and heat treatment of seven other pelleted samples of the reaction product of Example 3. The pellets were prepared in a manner similar to that described for the pellets of Example 7. The electrical test measurements were carried out in a similar manner to that described in Example 6. The results of these tests are reported in Table II as follows:

*Table II*

| Sample No. | Weight, gms.[1] | Heat treatment | Cumulative percent weight loss | Resistivity, ohm-cm. | TEP, $\mu$v./° C. |
|---|---|---|---|---|---|
| 1 | 0.1877 | 4 hrs. at 350° C./0.25 mm | 8 | 17,000 | −2 |
| 2 | 0.1918 | 1 hr. at 375° C./0.25 mm | 10.4 | 4,200 | −16 |
| 3 | 0.1970 | 2 hrs. at 375° C./0.25 mm | 11.5 | 2,500 | −28 |
| 4 | 0.1888 | 3 hrs. at 375° C./0.25 mm | 12.5 | 1,800 | −21 |
| 5 | 0.1983 | 4 hrs. at 375° C./0.25 mm | 13.7 | 910 | −67 |
| 6 | 0.1978 | 5¼ hrs. at 375–400° C./0.25 mm. | 15.0 | 640 | −48 |
| 7 | 0.1937 | 7¼ hrs. at 375–400° C./0.25 mm. | 15.7 | 350 | −48 |

Samples heated at 375–400° C./0.3 mm. for 3 hrs.

| Sample No. | Weight, gms.[2] | Cumulative percent weight loss | Resistivity, ohm-cm. | TEP, $\mu$v./° C. |
|---|---|---|---|---|
| 1 | 0.1638 | 12.0 | | |
| 2 | 0.1692 | 11.7 | | |
| 3 | 0.1718 | 12.7 | | |
| 4 | 0.1628 | 13.7 | 1,400 | −58 |
| 5 | 0.1680 | 15.0 | 650 | −49 |
| 6 | 0.1630 | 15.8 | 500 | −59 |

Samples heated at 400° C./0.2–0.3 mm. for 2 hrs.

| 1 | 0.1555 | 17.2 | 420 | −77 |
| 2 | 0.1619 | 15.6 | 400 | −81 |
| 3 | 0.1646 | 16.4 | 430 | −77 |

Samples heated at 400° C./0.2–0.3 mm. for 3 hrs.

| 1 | 0.1497 | 20.2 | 170 | −76 |
| 2 | 0.1559 | 18.6 | 170 | −84 |
| 3 | 0.1593 | 19.1 | 190 | −84 |

Samples heated at 400–420° C./0.2–0.3 mm. for 2½ hrs.

| 1 | 0.1488 | 20.6 | 200 | −77 |
| 2 | 0.1544 | 19.4 | 170 | −66 |
| 3 | 0.1570 | 20.3 | 200 | −73 |

Samples heated at 430° C./0.2–0.3 mm. for 3 hrs.

| 1 | 0.1466 | 21.9 | 160 | −73 |
| 2 | 0.1519 | 20.8 | 140 | −69 |
| 3 | 0.1547 | 21.4 | 160 | −70 |

Samples heated at 430° C./0.2–0.3 mm. for 4 hrs.

| 1 | 0.1447 | 22.8 | 140 | −66 |
| 2 | 0.1502 | 21.6 | 130 | −71 |

Samples heated at 430° C./0.2–0.3 mm. for 19 hrs.

| 1 | 0.1435 | 23.4 | 140 | −56 |
| 2 | 0.1480 | 22.8 | 130 | −57 |

[1] Original sample weights before any heat treating.
[2] Weights after indicated heat treatment.

The data of Table II show the production of some excellent thermoelectric pellets by heat treating. These pellets of Table II have high N-type conductivity thermoelectric power.

The hydrogen sulfide/pyromellitonitrile reaction products have semiconductive properties and they are especially useful for the production of pelleted material which can be heat treated to produce very good thermoelectric articles. The hydrogen sulfide/pyromellitonitrile reaction products can be heat treated in powdered form or in pellet form. If heat treated in powdered form, the powder will of course tend to fuse. After heat treating the powdered material it should be reground before pelleting. Actually the heat treating of the samples described in detail in the examples above was done with the material in pelleted form. It is more difficult to pellet the material after heat treating. Thus it is seen that the pyrolyzed pelleted products of hydrogen sulfide and pyromellitonitrile reaction product are especially useful as semiconductive bodies for components in barrier layer devices such as thermoelectric heating or cooling devices, diodes, power rectifiers, transistors, infrared detectors, photoelectric devices, thermistors, etc.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Pyromellitonitrile/hydrogen sulfide, in substantially 1:2 molar ratio respectively, reaction products.
2. Pyrolyzed pyromellitonitrile/hydrogen sulfide, in substantially 1:2 molar ratio respectively, reaction products having semiconductor properties.
3. Semiconductor bodies comprising pyrolyzed pyromellitonitrile/hydrogen sulfide, in substantially 1:2 molar ratio respectively, reaction product pellets having semiconductor properties.
4. A process of making a product of claim 1 comprising contacting hydrogen sulfide and pyromellitonitrile.
5. A process of claim 4 wherein the contacting is carried out in the presence of an inert solvent for pyromellitonitrile.
6. A process of claim 5 wherein the contacting is carried out in the presence of a base catalyst.
7. A process of claim 6 wherein said catalyst is sodium hydroxide.
8. A process of claim 6 wherein said catalyst is ammonium hydroxide.
9. A process of claim 6 wherein said catalyst is pyridine.
10. A process of pyrolyzing a reaction product of claim 1 comprising heating said reaction product in an inert atmosphere at a temperature in the range of about 180–700° C. for a time sufficient to provide a product having semiconductor properties.
11. A process of claim 10 wherein said temperature is in the range of 300–600° C.

References Cited in the file of this patent

Lawton et al.: J. Org. Chem. 24, 26–28 (1949).

Degering: "An Outline of Organic Nitrogen Compounds," 1945, p. 508.